United States Patent Office 3,819,649

Patented June 25, 1974

3,819,649

N-METHYL N-SULFENYLATED OXIME CARBAMATES

Gerhard Zumach, Peter Siegle, and Ingeborg Hammann, Cologne, and Paul-Ernst Frohberger, Leverkusen, Germany, assignors to Bayer Aktiengesellschaft, Leverkusen, Germany No Drawing. Filed Jan. 9, 1973, Ser. No. 322,266
Claims priority, application Germany, Jan. 22, 1972, P 22 03 050.8
Int. Cl. C07d *71/00, 89/06*
U.S. Cl. 260—327 M 8 Claims

ABSTRACT OF THE DISCLOSURE

N-methyl N-sulfenylated oxime carbamates of the formula

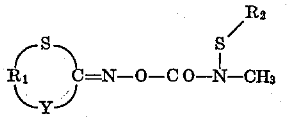

(I)

in which

Y is S or O,
$R_1$ is alkylene of 2 or 3 carbon atoms which may be substituted by alkyl or aryl, preferably phenyl or lower alkyl of 1 to 4 carbon atoms, and
$R_2$ is trihalomethyl, phenyl or halo-phenyl, which possess insecticidal, acaricidal and fungicidal properties.

The present invention relates to and has for its objects the provision of new N-methyl N-sulfenylated oxime carbamates, i.e. N-methyl-N-trihalomethyl-, -N-phenyl or -N-halophenyl-mercapto-carbamic acid esters of 2-oximino-1,3 -dithiolane, -oxathiolane, -dithiane or -oxathiane as well as their alkyl and aryl substitution products, which possess insecticidal, acaricidal and fungicidal properties, active compositions in the form of mixtures of such compounds with solid and liquid dispersible carrier vehicles, and methods for producing such compounds and for using such compounds in a new way especially for combating insects, acarids and fungi, with other and further objects becoming apparent from a study of the within specification and accompanying examples.

It is known from U.S. Patent Specification No. 3,183,148 that certain carbamic acid derivatives of oximes are good insecticides. Thus, carbamates of oximes of cyclic heteroketo compounds, such as the N-methylcarbamate of 2-oximino-1,3-dithiolane (Compound A) have been described in the patent literature as insecticides.

The present invention provides N-methyl-N-sulfenylated oxime carbamates of the general formula

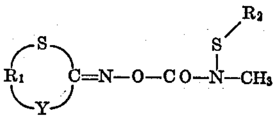

(I)

in which

Y is S or O,
$R_1$ is alkylene of 2 or 3 carbon atoms which may be substituted by alkyl or aryl, preferably phenyl or lower alkyl of 1 to 4 carbon atoms,
$R_2$ is trihalomethyl, phenyl or halo-phenyl.

It is decidely surprising that the compounds according to the invention exhibit a higher insecticidal, fungicidal and acaricidal activity than previously known carbamates of heterocyclic oximes which are the chemically closest compounds of the same type of activity. The substances according to the invention therefore represent an enrichment of the art.

The invention also provides a process for the production of an oxime carbamate of the formula (I) in which an N-sulfenylated carbamic acid fluoride of the general formula

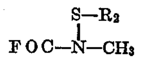

(II)

in which $R_2$ has the meaning stated above, is reacted with an oxime of the general formula

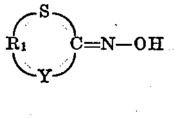

(III)

in which $R_1$ and Y have the meanings stated above, in the presence of an acid-binding agent and, optionally, of a diluent.

When 2-oximino-1,3-dithiolane and N-(dichlorofluoromethylthio)-N-methylcarbamic acid fluoride are used as starting materials, the reaction proceeds as follows:

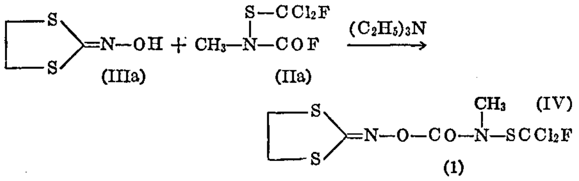

As described in German Published Specification DAS 1,297,095 N-sulfenylated carbamic acid fluorides of the formula (II) can be prepared by reaction of sulfenic acid halides with carbamic acid fluorides.

Suitable starting compounds of the formula (II) include:

N-(trichloromethylthio)-N-methylcarbamic acid fluoride,
N-(dichlorofluoromethylthio)-N-methylcarbamic acid fluoride,
N-(chlorodifluoromethylthio)-N-methylcarbamic acid fluoride,
N-(trifluoromethylthio)-N-methylcarbamic acid fluoride,
N-(phenylmercapto)-N-methylcarbamic acid fluoride, and
N-(4-chlorophenylmercapto)-N-methylcarbamic acid fluoride.

Some of the heterocyclic oximes of the formula (III) are known; they can all be prepared according to known processes as described in U.S. Patent Specification No. 3,183,148.

Suitable starting compounds of the formula (III) include:

2-oximino-1,3-dithiolane,
4-methyl-2-oximino-1,3-dithiolane,
4,4-dimethyl-2-oximino-1,3-dithiolane,
4-phenyl-2-oximino-1,3-dithiolane,
2-oximino-1,3-oxathiolane,
2-oximino-1,3-dithiane, and
2-oximino-1,3-oxathiane.

As diluent, all inert organic solvents are suitable. These include ethers, such as diethyl ether, tetrahydrofuran and dioxane; hydrocarbons, such as benzene; and chlorinated hydrocarbons, such as chloroform and chlorobenzene.

In order to bind the hydrogen fluoride liberated in the reaction, a tertiary base, such as triethylamine, is preferably added to the reaction mixture.

The reaction temperatures can be varied within a fairly wide range; in general, the reaction is carried out at about 0–100° C., preferably at 20–40° C.

In carrying out the process according to the invention, equimolar amounts are preferably used.

The active compounds according to the invention exhibit, with low toxicity to warm blooded animals, strong insecticidal, acaricidal and fungicidal properties and can therefore be used with good results for the control of noxious sucking and biting insects and Diptera, as well as mites and seed-borne and soil-borne phytopathogenic fungi.

To the sucking insects there belong, in the main, aphids (*Aphidae*) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillars (*Lepidoptera*) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*).

Also to be classed with the biting insects are beetles (*Coleoptera*), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra or Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, *Orthoptera*, for example the house cricket (*Acheta domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (*Acari*) there are classed, in particular, the spider mites (*Tetranychidae*) such as the two-spotted spider mite (*Tetranychus urticae*) and the European red mite (*Paratetranychus pilosus-Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

When applied against hygiene pests and pests of stored products, particularly flies and mosquitoes, the process products are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketone (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides, and fungicides, or rodenticides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

The substances according to the invention can also be used as seed dressings and soil fungicides. In the case of seed treatment, there are required, in general, amounts of active compound from 0.01 to 10 g. per kg. of seed, preferably 0.05 to 5 g.

For soil treatment, amounts of active compound of 1 to 500 g./m.$^3$ of soil, preferably 10 to 200 g., are generally necessary.

Furthermore, the present invention contemplates methods of selectively killing, combating or controlling pests, e.g. insects, acarids and fungi, which comprises applying to at least one of correspondingly (a) such insects, (b) such acarids, (c) such fungi, and (d) the corresponding hibitat thereof, i.e. the locus to be protected, a correspondingly combative or toxic amount, i.e. an insecticidally, acaricidally or fungicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected surperiority and outstanding activity of the particular new compounds of the present invention are illustrated, without limitation, by the following examples:

EXAMPLE 1

Laphygma test

Solvent: 3 parts by weight dimethyl formamide.

Emulsifier: 1 part by weight alkylarylpolyglycol ether.

To produce a suitable preparation of active compound, 1 part by weight of active compound was mixed with the stated amount of solvent which contained the stated amount of emulsifier, and the concentrate was diluted with water to the desired concentration.

Cotton leaves (*Gossypium barbadense*) were sprayed with the preparation of active compound until dew moist and were then infested with caterpillars of the owlet moth (*Laphygma exigua*).

After the specified period of time, the degree of destruction was determined as a percentage. 100% means that all the caterpillars were killed, whereas 0% denotes that none of the caterpillars were killed.

The active compounds, the concentrations of the active compounds, the evaluation times and the results can be seen from the following Table 1.

TABLE 1.—LAPHYGMA TEST (Plant-damaging insects)

| Active compounds | | Concentration of active compound in percent | Degree of destruction in percent after 3 days |
|---|---|---|---|
| 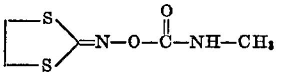 (Known) | (A) | 0.01<br>0.001 | 100 |
| 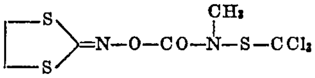 | (2) | 0.01<br>0.001 | 100<br>95 |
| 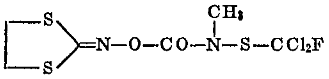 | (1) | 0.01<br>0.001 | 100<br>100 |
| 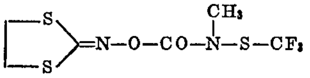 | (3) | 0.01<br>0.001 | 100<br>65 |
| 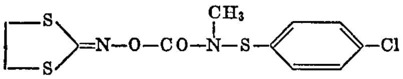 | (5) | 0.01<br>0.001 | 100<br>95 |

EXAMPLE 2

Euscelis test

Solvent: 3 parts by weight dimethyl formamide.

Emulsifier: 1 part by weight alkylarylpolyglycol ether.

To produce a suitable preparation of active compound, 1 part by weight of active compound was mixed with the stated amount of solvent which contained the stated amount of emulsifier, and the concentrate was diluted with water to the desired concentration.

Leaves of broad beans (*Vicia faba*) were sprayed with the preparation of active compound until dew moist and were then infested with cicadas (*Euscelis bilobatus*).

After the specified period of time, the degree of destruction was determined as a percentage. 100% means that all the cicadas were killed, whereas 0% denotes that none of the cicadas were killed.

The active compounds, the concentrations of the active compounds, the evaluation times and the results can be seen from the following Table 2.

TABLE 2.—EUSCELIS TEST

Plant-damaging insects

| Active compounds | | Concentration of active compound in percent | Degree of destruction in percent after 3 days |
|---|---|---|---|
| 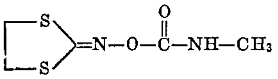 (Known) | (A) | 0.004<br>0.0008<br>0.00016 | 100<br>25<br>0 |
| 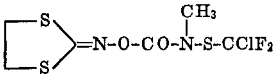 | (4) | 0.004<br>0.0008<br>0.00016 | 0<br>100<br>10<br>55 |
| 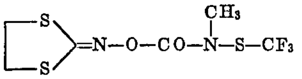 | (3) | 0.004<br>0.0008<br>0.00016 | 100<br>100<br>45 |

EXAMPLE 3

Tetranychus test/resistant

Solvent: 3 parts by weight dimethyl formamide.

Emulsifier: 1 part by weight alkylaryl polyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 3.

TABLE 3.—TETRANYCHUS TEST/RESISTANT (Plant-damaging mites)

| Active compounds | | Concentration of active compound in percent | Degree of destruction in percent after 2 days |
|---|---|---|---|
| 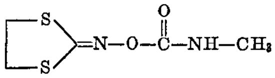 (Known) | (A) | 0.1<br>0.02<br>0.004 | 99<br>80<br>0 |
| 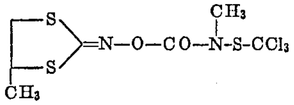 | (6) | 0.1<br>0.02<br>0.004 | 100<br>98<br>60 |
| 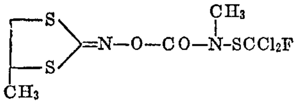 | (7) | 0.1<br>0.02<br>0.004 | 100<br>100<br>95 |

EXAMPLE 4

Agar plate test

Test for fungitoxic effectiveness and breadth of the activity spectrum.

Solvent: Acetone.

Parts by weight: (a) 1000; (b) 100.

To produce a suitable preparation of the active compound, 1 part by weight of the active compound is taken up in the stated amount of solvent.

To potato dextrose agar which has been liquefied by heating there is added the preparation of the active compound in such an amount that the desired concentration of active compound is set up therein. After thorough shaking to achieve a uniform dispersion of the active compound, the agar is poured into Petri dishes under sterile conditions. When the mixture of substrate and active compound has solidified, test fungi from pure cultures are inoculated on to it in small discs of 5 mm. diameter. The Petri dishes remain at 20° C. for 3 days for incubation.

After this time, the inhibiting action of the active compound on the mycelium growth is determined in categories, taking into account the untreated control. 0 means no mycelium growth, either on the treated substrate or on the inoculum; the symbol — means mycelium growth on the inoculum only, no spread to the treated substrate; and the symbol + means mycelium growth from the inoculum on to the treated substrate, similar to the spread to the untreated substrate of the control.

The active compounds, the concentration of the active compounds, the test fungi and the inhibition effects achieved can be seen from the following Table:

TABLE 4.—AGAR PLATE TEST

| Active compound | | Concentration of active compound in the substrate in mg/l. | *Corticium rolfsii* | *Sclerotinia sclerotiorum* | *Verticillium alboatrum* | *Thielaviopsis basicola* | *Phytophthora cactorum* | *Fusarium culmorum* | *Fusarium oxysporum* | *Fusarium solani fi pis.* |
|---|---|---|---|---|---|---|---|---|---|---|
| Untreated | | | + | + | + | + | + | + | + | + |
| 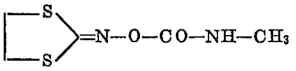 (known) | (A) | (a) 10 | + | + | + | + | + | + | + | + |
| | | (b) 100 | + | + | + | + | + | + | + | + |
| 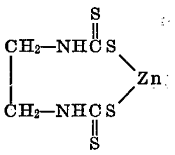 (known) | (B) | (a) 10 | + | + | + | + | + | + | + | + |
| | | (b) 100 | 0 | + | + | + | 0 | − | 0 | + |
| 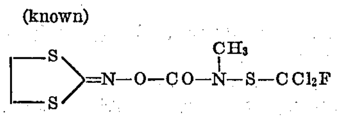 | (1) | (a) 10 | 0 | 0 | + | 0 | 0 | 0 | 0 | + |
| | | (b) 100 | 0 | 0 | 0 | 0 | 0 | 0 | 0 | 0 |
| 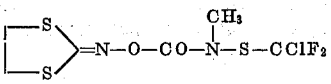 | (4) | (a) 10 | 0 | − | 0 | 0 | 0 | + | 0 | 0 |
| | | (b) 100 | 0 | 0 | 0 | 0 | 0 | 0 | 0 | 0 |

EXAMPLE 5

Seed dressing test/bunt of wheat (seed-borne mycosis)

To produce a suitable dry dressing, the active compound is extended with a mixture of equal parts by weight of talc and kieselguhr to give a finely powdered mixture with the desired concentration of the active compound.

Wheat seed is contaminated with 5 g. of the chlamydospores of *Tilletia caries* per kg. of seed. To apply the dressing, the seed is shaken with the dressing in a closed glass flask. The seed, on moist loam under a cover of a layer of muslin and 2 cm. of moderately moist compost soil, is exposed to optimum germination conditions for the spores for 10 days at 10° C. in a refrigerator.

The germination of the spores on the wheat grains, each of which is contaminated with about 100,000 spores, is subsequently determined microscopically. The smaller the number of spores which have germinated, the more effective is the active compound.

The active compounds, the concentrations of the active compounds in the dressing, the amounts of dressing used and the percentage spore germination can be seen from the following Table 5.

TABLE 5.—SEED DRESSING TEST/BUNT OF WHEAT

| Active compounds | | Concentration of active compound in the dressing in percent by weight | Applied amount of dressing in g./kg. seed | Spore germination in percent |
|---|---|---|---|---|
| Non-dressed | | | | >10 |
| 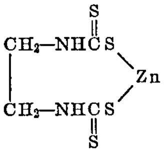 (known) | (A) | 10 | 1 | 5 |
| 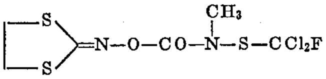 | (1) | 10<br>30 | 1<br>1 | 0.5<br>0.000 |
| 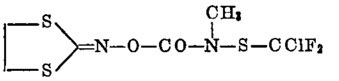 | (4) | 30 | 1 | 0.000 |

EXAMPLE 6

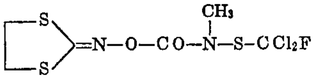

(1)

To a solution of 14 g. (0.1 mole) 2-oximino-1,3-dithiolane and 23 g. (0.11 mole) N-methyl-N-dichlorofluoromethylmercaptocarbamic acid fluoride in 150 ml. dioxane there was slowly added dropwise, with stirring, a solution of 10 g. triethylamine in 200 ml. dioxane. The temperature did not rise above 40° C. After 2 hours' stirring at room temperature, the mixture was brought to 50–60° C. for a further hour. It was then cooled, poured on to water and extracted with chloroform. After drying of the organic phase with $Na_2SO_4$, the solvent was evaporated. The residue was recrystallized from benzene/petrol for cleaning.

28 g. colorless crystals (86% yield), m.p. 101° C., were obtained.

EXAMPLE 7

Analogously with Example 6, there were obtained:

| | | |
|---|---|---|
| 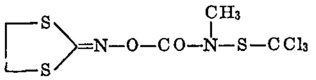 | (2) | M.P. 123° C |
| 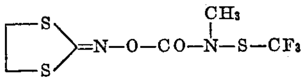 | (3) | M.P. 99° C. |
| 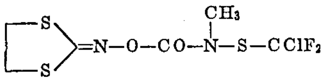 | (4) | M.P. 101° C. |
| 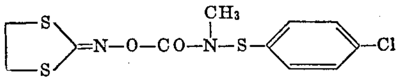 | (5) | M.P. 110° C. |
| 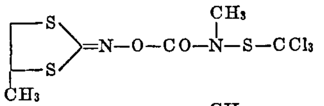 | (6) | M.P. 87° C. |
| 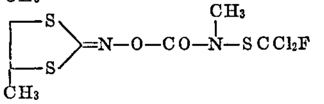 | (7) | M.P. 74° C. |

It will be appreciated that the instant specification and examples are set forth by way of illustration and not limitation, and that various modifications and changes may be made without departing from the spirit and scope of the present invention.

What is claimed is:

1. An N-sulfenylated oxime carbamate of the formula

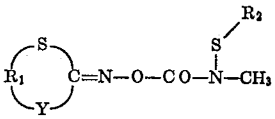

(I)

in which

Y is S or O, $R_1$ is alkylene of 2 or 3 carbon atoms optionally substituted by lower alkyl or phenyl, and $R_2$ is trihalomethyl, phenyl or halo-phenyl.

2. A compound according to claim 1 wherein such compound is 2-oximino-1,3-dithiolanyl N-methyl-N-dichlorofluoromethylmercapto-carbamate of the formula

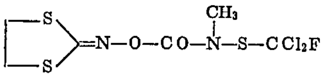

(1)

3. A compound according to claim 1 wherein such compound is 2-oximino-1,3-dithiolanyl N-methyl-N-trichloromethylmercapto-carbamate of the formula

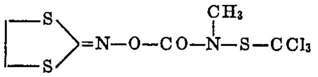

(2)

4. A compound according to claim 1 wherein such compound is 2-oximino-1,3-dithiolanyl N-methyl-N-trifluoromethylmercapto-carbamate of the formula

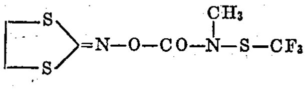

(3)

5. A compound according to claim 1 wherein such compound is 2-oximino-1,3-dithiolanyl N-methyl-N-difluorochloromethylmercapto-carbamate of the formula

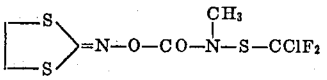

(4)

6. A compound according to claim 1 wherein such compound is 2-oximino-1,3-dithiolanyl N-methyl-N-p-chlorophenylmercapto-carbamate of the formula

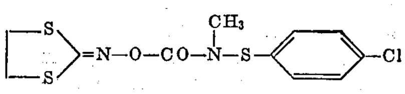

(5)

7. A compound according to claim 1 wherein such compound is 2-oximino-4-methyl-1,3-dithiolanyl N-methyl-N-trichloromethylmercapto-carbamate of the formula

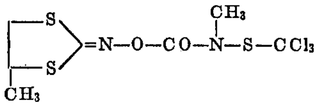

(6)

8. A compound according to claim 1 wherein such compound is 2-oximino-4-methyl-1,3-dithiolanyl N-methyl-N-dichlorofluoromethylmercapto-carbamate of the formula

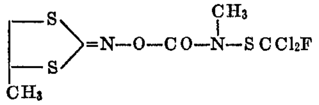

(7)

References Cited

UNITED STATES PATENTS

| | | | |
|---|---|---|---|
| 3,193,561 | 7/1965 | Addor | 260—327 |
| 2,945,780 | 7/1960 | Jones | 167—22 |
| 2,992,966 | 7/1961 | Jacobi | 167—30 |
| 3,663,594 | 5/1972 | Brown | 260—470 |

FOREIGN PATENTS

| | | | |
|---|---|---|---|
| 1,922,929 | 11/1970 | Germany | 260—479 |

HENRY R. JILES, Primary Examiner

C. M. S. JAISLE, Assistant Examiner

U.S. Cl. X.R.

71—90; 424—276, 277

(5/69)

CERTIFICATE OF CORRECTION

Patent No. 3,819,649 Dated June 25, 1974

Inventor(s) GERHARD ZUMACH ET AL

It is certified that error appears in the above-identified patent and that said Letters Patent are hereby corrected as shown below:

Col. 7, Table 1, last column in Table, compound (A) under "100"

insert -- 0 --.

Col. 7, Table 2, last column in Table, compound (4), should read as follows:

-- 100
100
55--.

Col. 10, Table 4, correct heading of last column to read as follows:

-- Fusa-
rium
solani f.
pisi --.

Signed and sealed this 22nd day of October 1974.

(SEAL)
Attest:

McCOY M. GIBSON JR.
Attesting Officer

C. MARSHALL DANN
Commissioner of Patents